United States Patent
Takatoh et al.

(10) Patent No.: US 9,519,143 B2
(45) Date of Patent: Dec. 13, 2016

(54) HEADUP DISPLAY APPARATUS FOR VEHICLE

(71) Applicant: NIPPON SEIKI CO., LTD., Niigata (JP)

(72) Inventors: Katsuei Takatoh, Niigata (JP); Mitsugu Kobayashi, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 0 days.

(21) Appl. No.: 14/352,605

(22) PCT Filed: Oct. 5, 2012

(86) PCT No.: PCT/JP2012/075882
§ 371 (c)(1),
(2) Date: Apr. 17, 2014

(87) PCT Pub. No.: WO2013/058123
PCT Pub. Date: Apr. 25, 2013

(65) Prior Publication Data
US 2014/0253821 A1 Sep. 11, 2014

(30) Foreign Application Priority Data
Oct. 20, 2011 (JP) .................................. 2011-230271

(51) Int. Cl.
*G02B 27/10* (2006.01)
*G02B 27/01* (2006.01)
*B60K 35/00* (2006.01)

(52) U.S. Cl.
CPC ........... *G02B 27/0101* (2013.01); *B60K 35/00* (2013.01); *B60K 2350/2052* (2013.01); *G02B 2027/0118* (2013.01)

(58) Field of Classification Search
CPC ..................................................... G02B 27/01
See application file for complete search history.

(56) References Cited

U.S. PATENT DOCUMENTS

2010/0067118 A1* 3/2010 Takahashi .............. G02B 27/01
359/633

FOREIGN PATENT DOCUMENTS

JP 04-184481 A 7/1992
JP 06-068956 U 3/1994
(Continued)

OTHER PUBLICATIONS

International Search Report issued in International Application No. PCT/JP2012/075882 with Date mailed Oct. 10, 2012.

*Primary Examiner* — Paisley L Arendt
*Assistant Examiner* — Edmond Lau
(74) *Attorney, Agent, or Firm* — McDermott Will & Emery LLP (57) ABSTRACT

A headup display apparatus for vehicles is capable of suppressing deterioration of luminance of virtual images, while avoiding a cost increase. This headup display apparatus includes: a light emitting unit having at least a light emitting body that emits output light; a liquid crystal display which emits display light; a concave mirror which reflects the display light; and a housing which houses the light emitting unit, the liquid crystal display, and the concave mirror. The output light that has been emitted from the light emitting body, and the display light that has been reflected by the concave mirror are radiated to a windshield through a translucent cover, and a virtual image obtained by means of the radiation is visually recognized by a driver. The light emitting unit is disposed inside of the housing such that the light emitting unit faces the windshield with the translucent cover therebetween.

1 Claim, 4 Drawing Sheets

(56) References Cited

FOREIGN PATENT DOCUMENTS

| JP | 2008-051970 A | 3/2008 |
|----|---------------|--------|
| JP | 2010-197987 A | 9/2010 |

\* cited by examiner

HEADUP DISPLAY APPARATUS FOR VEHICLE

RELATED APPLICATIONS

This application is a national phase application of the U.S. National Phase under 35 U.S.C. §371 of International Application No. PCT/JP2012/075882, filed on Oct. 5, 2012, which in turn claims the benefit of Japanese Application No. 2011-230271, filed on Oct. 20, 2011, the disclosures of which Applications are incorporated by reference herein.

TECHNICAL FIELD

The present invention relates to a headup display apparatus for a vehicle, which radiates light from a light emitting body to a vehicle windshield as a projection member, and makes a user of a vehicle to visually recognize a virtual image obtained by the radiation.

BACKGROUND ART

As such a headup display apparatus for vehicle, the one disclosed in Patent Literature 1 has been known. The headup display apparatus for a vehicle described in Patent Literature 1 is installed inside an instrument panel of a vehicle. The headup apparatus comprises a liquid crystal display (a display) that emits travel information about traveling of a vehicle as display light, a light emitting body (a light emitting device) that is comprised of an LED and arranged adjacent to the liquid crystal display, a printed wiring board provided with a wiring pattern for mounting a light emitting body, a reflection mirror (a reflection member) that reflects display light emitted from a liquid crystal display and output light (illumination light) emitted from a light emitting body, and a unit case (a housing) that houses a liquid crystal display, a light emitting body, a printed wiring board, and a reflection mirror. On the upper end side of the unit case, a translucent part that transmits the display light and output light reflected by the reflection mirror is formed. On the lower end side of the unit case, a printed wiring board provided with a liquid crystal display and a light emitting body is arranged.

According to a headup display apparatus configured as described above, display light emitted from a liquid crystal display and reflected by a reflection mirror and output light emitted from a light emitting body are radiated to a vehicle windshield as a projection member through a translucent part provided in a unit case, and a driver (a vehicle user) visually recognizes a virtual image obtained by the radiation through a windshield.

Further, in this case, a printed wiring board of a headup display apparatus for a vehicle is provided with a control means comprising a microcomputer that operates a liquid crystal display and lights up a light emitting body. Receiving a state signal indicating small amount of fuel remained, for example, such a control means operates a liquid crystal display to display a letter "CHECK" in addition to travel information (vehicle speed display), and at the same time, lights up a light emitting body to display a circular warning indication described later as a part of the virtual image.

Immediately after the liquid crystal display emits the vehicle speed display light and the letter display light "CHECK", the light emitting body is lit, and the vehicle speed light, the letter display light and the output light emitted from the light emitting body are reflected to the driver through the reflection mirror, the translucent part of the unit case, and the windshield, whereby the driver can view a virtual image comprising the vehicle speed, letter "CHECK" and circular warning indication superimposed on a landscape. The warning indication displayed as a part of the virtual image certainly notifies the driver that the letter "CHECK" is being displayed.

CITATION LIST

Patent Literature

Patent Literature 1: Japanese Unexamined Patent Application Publication No. 4-184481

SUMMARY OF THE INVENTION

Problems to be Solved by the Invention

In the headup display apparatus for a vehicle described in the Patent Literature 1, a printed wiring board that is comprised of an LED and provided with a light emitting body is arranged in the lower end side of a unit case, output light emitted from a light emitting body is reflected to a driver through a reflection mirror, and is reflected to a translucent part located in the upper end side of a unit case through a windshield. A driver can visually recognize a virtual image composed of a circular warning indication obtained by the reflection.

However, in the configuration that output light is reflected by a reflection mirror, luminance of a virtual image composed of a circular warning display recognized by a driver may be decreased due to deterioration of emission efficiency of output light after being reflected by a reflection mirror.

To prevent a luminance decrease in a virtual image, a high-luminance LED may be used as a light emitting body. However, when a high-luminance LED is used as a light emitting body, an exclusive separate heat radiation member is required to radiate heat emitted by a high-luminance LED. This increases parts cost and assembly cost, causing a problem of cost increase.

The present invention has been made in order to solve the above problem. Accordingly, it is an object of the present invention to provide a headup display apparatus for a vehicle capable of suppressing a luminance decrease in a virtual image, while avoiding a cost increase.

Means for Solving the Problem

According to the present invention, there is provided a headup display apparatus for a vehicle comprising a light emitting device provided with at least a light emitting body to emit output light; a display for emitting display light; a reflection member for reflecting the display light; and a housing for housing the light emitting device, the display, and the reflection member, wherein the output light emitted from the light emitting body and the display light reflected by the reflection member are radiated to a predetermined projection member through a translucent part formed in the housing, and a virtual image obtained by the radiation is visually recognized by a user of a vehicle, the light emitting device is arranged inside the housing so as to face the projection member across the translucent part.

Further, the light emitting body is fixed to the reflection member by using a predetermined fixing means such that a light emitting surface faces the translucent part.

Effect of the Invention

According to the present invention, it is possible to achieve the object and to provide a headup display apparatus

MODES FOR CARRYING OUT THE INVENTION

Hereinafter, an embodiment applying the present invention to a headup display apparatus for a vehicle will be described with reference to the accompanying drawings FIG. 1 to FIG. 5.

Figure 1:
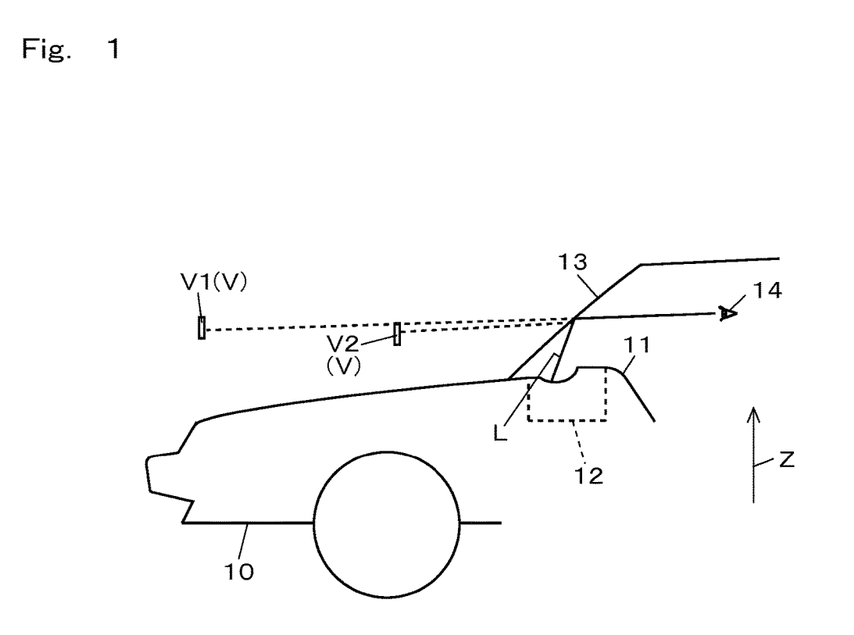
FIG. 1 is a schematic diagram of a headup display apparatus for a vehicle according to an embodiment of the present invention.

In a headup display apparatus for a vehicle, as shown in FIG. 1, output light L projected (radiated) by a display device 12 arranged inside an instrument panel 11 of a vehicle 10 is reflected toward a driver (a user) 14 of the vehicle 10 through a windshield 13 as a predetermined projection member of the vehicle 10, thereby displaying a virtual image V. In other words, a headup display apparatus for a vehicle radiates the output light L, which is composed of display light L1 emitted from a liquid crystal display described later provided in the display device 12 and output light L2 emitted from a light emitting body described later provided in the display device 12, to the windshield 13 (the projection member), and makes the driver 14 to visually recognize a virtual image (a display image) V obtained by the radiation. Thus, the driver 14 can view the virtual image V superimposed on a landscape.

Figure 2:
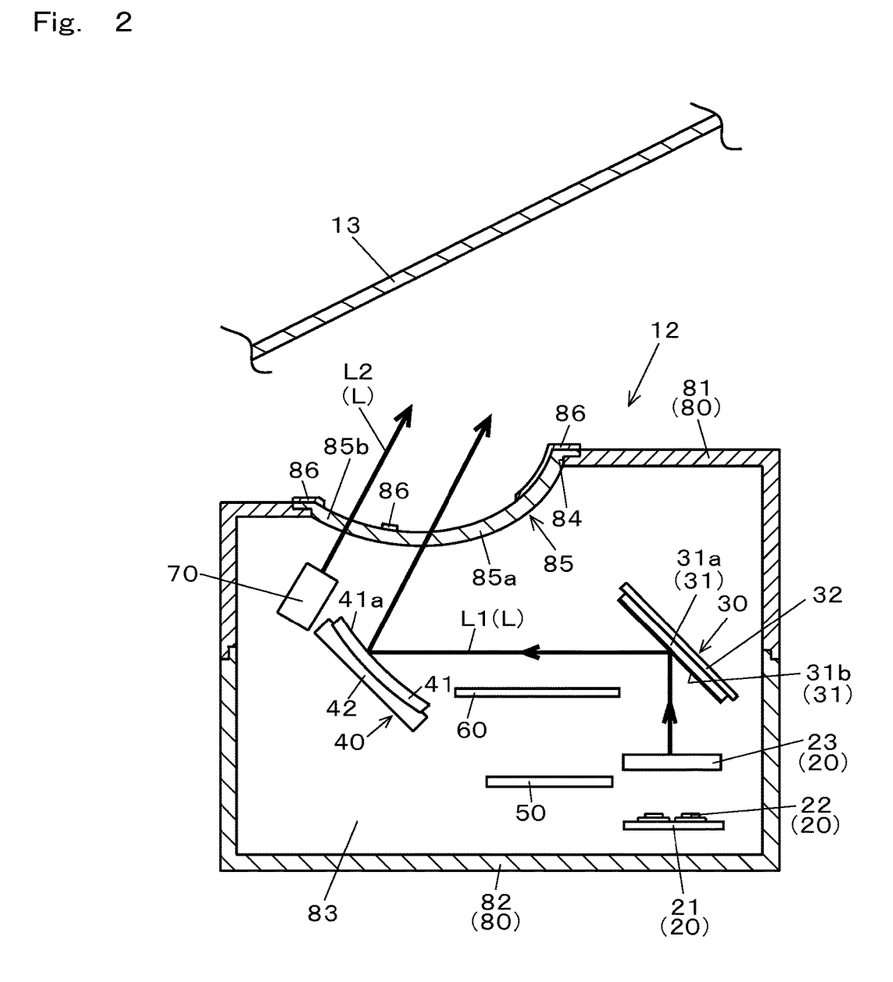
FIG. 2 is a sectional view showing a display unit and a projection member according to the same embodiment.

As shown in FIG. 2, the display device 12 primarily comprises a liquid crystal display (a display) 20, a first reflector 30, a second reflector 40, a printed wiring board 50, a cover member 60, a light emitting unit (a light emitting device) 70, and a housing 80.

The liquid crystal display 20 primarily comprises a light source 22 composed of an LED mounted on a wiring substrate 21, a TFT type liquid crystal display element (a display element) 23 located on the front side of (right above) the light source 22 so as to form display light L1 by transmitting illumination light from the light source 22, and a synthetic resin housing (not shown) for housing the wiring substrate 21, light source 22 and liquid crystal display element 23. This means that the light source 22 is arranged behind (right below) the liquid crystal display element 23, and the liquid crystal display element 23 displays predetermined information (display information described later) by the light emitted from the light source 22.

The housing has a window part for facing a display area (not shown) of the liquid crystal display element 23. The display light L1 emitted from the liquid crystal element 23 is led to the first reflector 30 passing through the window part.

The liquid crystal display 20 configured as above is provided in the housing 80 such that an emission side of the display light L1 faces a cold mirror described later provided in the first reflector 30, and is held stationary at a position and in a direction such that an optical axis of the display light L1 crosses the cold mirror.

The liquid crystal element 23 displays information (e.g., a vehicle speed) to be displayed in a liquid crystal drive circuit described later by lighting a numeric value or the like. The liquid crystal display 20 outputs the display light L1 consisting of light in a visible wavelength range, and may use the light source 22 that emits red light (primarily in a lighting wavelength range of 610 to 640 nm). It is needless to say that the information to be displayed is not limited to a vehicle speed, but includes all display forms such as an engine speed.

The first reflector 30 comprises a cold mirror 31, and a mounting member 32 for mounting and fixing the cold mirror 31 by using a predetermined mounting means.

The cold mirror 31 comprises a substantially rectangular glass substrate 31a, and a first reflection layer 31b formed on one side (a side facing a concave mirror described later of the second reflector 40) of the glass substrate 31a. The first reflection layer 31b comprises a multiplayer interference film with different film thickness, and is formed by a method such as vapor deposition. The cold mirror 31 is arranged in an inclined state at a position where the display light L1 emitted from the liquid crystal display 20 (the liquid crystal display element 23) is reflected to the second reflector 40 (the concave mirror).

The cold mirror 31 reflects light in a visible wavelength range (450 to 750 nm) including a light emitting wavelength range of the liquid crystal display 20 at high reflectance (e.g., 80% or higher), and reflects light other than that in the visible wavelength range at low reflectance. In this case, the cold mirror 31 adopts a mirror that reflects light other than that in the visible wavelength range, especially light in an infrared wavelength range (infrared rays or heat rays of sunlight) at low reflectance (e.g., 15% or lower). Light not reflected by the first reflection layer 31b is configured to transmit through the cold mirror 31.

In the embodiment, the cold mirror 31 and liquid crystal display 20 are arranged at a position that is not directly faced from a translucent cover described later of the housing 80, and is constructed not to be directly exposed to light from outside (external light) such as sunlight. The mounting member 32 is made of black synthetic resin material, for example, and is fixed to the housing 80.

Figure 3:
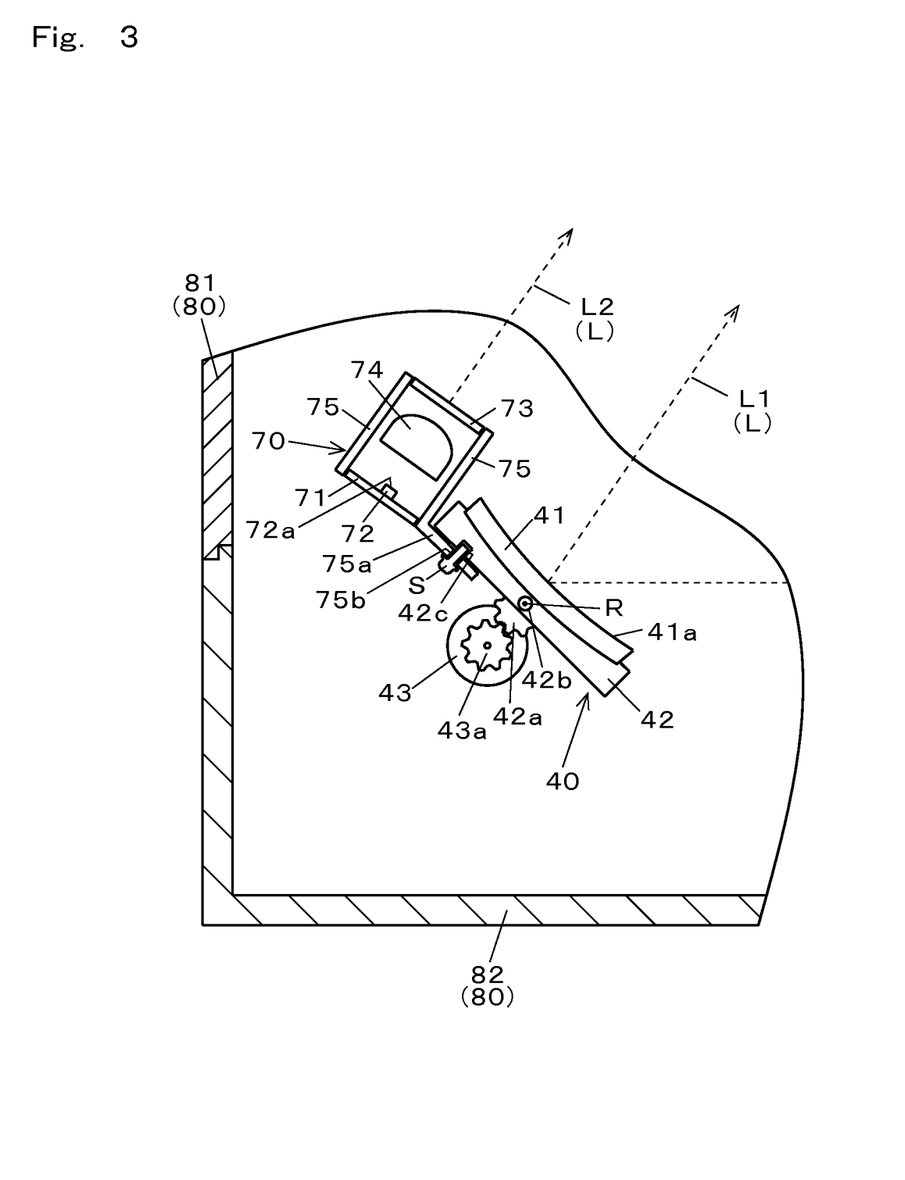
FIG. 3 is a magnified cross section showing a second reflector, and a light emitting unit in FIG. 2.

As shown in detail in FIG. 3, the second reflector 40 comprises a concave mirror (reflecting member) 41, a holding member 42, and a stepping motor 43. The concave mirror 41 is formed by deposing a second reflection layer 41a on a polycarbonate resin substrate having a concave surface. In the concave mirror 41, the second reflection layer 41a is faced to the cold mirror 31 and translucent cover, and is arranged in an inclined state at a position able to be faced from the translucent cover.

The concave mirror 41 is configured to magnify and reflect (radiate) the display light L1 from the cold mirror 31 to the translucent cover (the windshield 13 of the vehicle 10). This means that the concave mirror 41 magnifies the display light L1 reflected by the cold mirror 31, and radiates the magnified display light L1 to the windshield 13 through the translucent cover.

The display light L1 reflected by the concave mirror 41 as described above is radiated to the windshield 13 (the surface of the windshield 13 close to the driver 14) through the translucent cover, and displays a virtual image. Thus, the driver 14 can visually recognize the virtual image V superimposed on a landscape.

Further, in this case, the concave mirror 41 is bonded to the holding member 42 by a two-sided adhesive tape. The holding member 42 is made of synthetic resin (e.g., ABS), and is integrally formed with a gear part 42a and an axis part 42b. The axis part 42b of the holding member 42 is to be fixed to a journal part (not shown) provided in the housing 80.

A gear 43a is fixed to a rotational axis of the stepping motor 43. The gear 43a is engaged with a gear part 42a of the holding member 42. The concave mirror 41 is supported together with the holding member 42 in a rotatable state. The stepping motor 43 rotates the concave mirror 41 around a predetermined rotational axis line R (e.g., an axis line along an axial direction of the axis part 42b), thereby adjusting a projection direction (a radiation direction) of the display light L1 with respect to the windshield 13.

The driver 14 operates a pushbutton switch as an operation means described later to adjust the angle of the concave mirror 41 such that the display light L1 is reflected to the eye position of the operator 14 (namely, the operator can visually recognize the virtual image V). At this time, the virtual image V becomes movable (adjustable in position) in a vertical (upper/lower) direction orthogonal to a horizontal direction of the windshield 13, corresponding to the operation of the pushbutton switch. The vertical direction mentioned here means the direction of the arrow Z in FIG. 1.

The printed wiring board 50 is composed of a rigid circuit board provided with a predetermined wiring pattern, for example, conductively connected to a circuit board described later provided in the light emitting unit 70, and fixed in the housing 80 by an appropriate fixing means.

The printed wiring board 50 is provided with a light source drive circuit described later for controlling lighting of the light source 22 mounted on the wiring board 21, a liquid crystal drive circuit for driving the liquid crystal display element 23, a motor drive circuit described later for controlling driving of the stepping motor 43, a light emitting body drive circuit described ed later for controlling lighting of the light emitting body provided in the light emitting unit 70, and a control means described later or the like.

The cover member 60 is made of black synthetic resin material, for example, positioned on the upper side of the circuit board 50 so as to cover mainly the circuit board 50, and fixed to the housing 80 by an appropriate fixing means like the circuit board 50.

The light emitting unit 70 as a light emitting device is located on the upper side of the second reflector 40 not to interrupt an optical path of the display light L1, and is comprised of a circuit board 71, a light emitting body 72 mounted on the circuit board 71, a semitransmissive cover part 73 arranged on the front side of the light emitting body 72 (i.e. between the light emitting body 72 and the translucent cover), a lens member 74 positioned between the light emitting body 72 and cover part 73, and a case body 75 constituting an outer case of the light emitting unit 70 (see FIG. 3).

The circuit board 71 comprises a rigid circuit board provided with a predetermined wiring part. The light emitting body 72 is mounted on the wiring part. The circuit board 71 is arranged in the case body 75 so as to cover the lower end side opening of the case body 75.

The light emitting body 72 is a light emitting body, which comprises a chip type light emitting diode (LED) for emitting red light, for example, and supplies the lens member 74 with illumination light (the aforementioned output light L2). In the example, the light emitting body 72 is mounted one on the circuit board 71. Two or more light emitting body 72 may be mounted on the circuit board 71.

The cover part 73 is composed of a semitransparent synthetic resin plate (or a glass plate) having a smoke tone of dark color, and is arranged in the case body 75 so as to cover the upper end side opening of the case body 75 located on the opposite side of the lower end side opening.

The lens member 74 is made of transmissive synthetic resin, fixed to the case body 75 by using an appropriate fixing means, and formed in a convex (plano-convex) lens shape with a flat rear side (close to the light emitting body 72) and a convex front side (close to the cover part 73) located on the opposite side of the rear side. The lens member 74 has a function as a condensing member to condense the output light L2 emitted from the light emitting body 72. In other words, the lens member 74 gives the output light L2 desired refraction, and emits a substantially collimated parallel output light to the cover part 73.

A diffusing member (not shown) comprising a diffusing sheet may be arranged between the lens member 74 and cover part 73 if necessary. Such a diffusing member has a function of diffusing (diffusely reflecting) external light coming into the case body 75 through the translucent cover and cover part 73, whereby internal parts such as the circuit board 71 and light emitting body 72 housed in the case body 75 are not illuminated. Therefore, it is possible to prevent reflection of internal parts to the windshield 13 caused by external light, and to suppress deterioration of display quality of the virtual image V.

The case body 75 is made of white synthetic resin, for example, formed substantially in a frame shape, and houses the circuit board 71 provided with the light emitting body 72, the cover part 73, and the lens member 74. A part 75a is a flange portion formed integrally with the case body 75 along the rear surface of the holding member 42. The flange portion 75a is formed projecting from the outer wall surface of the lower end side of the case body 75 on the right-hand side in FIG. 3, along the rear surface of the holding member 42.

The flange portion 75a is provided with a screw hole 75b to insert a screw S as a fixing means. In a location of the holding member 42 corresponding to the flange portion 75a, there is provided a screw engaging portion 42c formed in a concave shape communicating with the screw hole 75 at a location of the holding member 42 corresponding to the flange portion 75a.

For fixing the case body 75 (the light emitting unit 70) to the holding member 42 (the second reflector 40), after aligning the screw hole 75b with the screw engaging portion 42c such that the cover part 73 faces a translucent cover 85, a required portion of the screw may engage with the screw engaging portion 42c, insert a threaded portion of the screw S onto the screw hole 75b, and engage a required portion of the threaded portion with the screw engaging portion 42c. In the example, the screw hole 75b is formed in two locations of the flange portion 75a, and the screw engaging portion 42c is formed in two locations corresponding to two screw holes 75b.

In the state that the light emitting unit 70 including the light emitting body 72 is being fixed to the holding member 42 (the concave mirror 41 bonded to the holding member 42) by using the screw S, the light emitting body 72 is configured such that a light emitting surface 72a faces the lens member 74 (the translucent cover).

The housing 80 is made of black light shielding resin material, for example, provided with an upper case 81 and a lower case 82, each having a substantially concave sectional shape, and houses the liquid crystal display 20, reflectors 30 and 40, printed wiring board 50, cover member 60, and light emitting unit 70 in a space 83 that is an internal space formed by the upper case 81 and lower case 82.

The upper case 81 is provided with an opening window portion 84 that is opened above the arranged position of the concave mirror 41 (close to the windshield 13 of the vehicle 10). The opening window portion 84 is provided with the translucent cover 85 as a transmissive part so as to cover the opening window portion 84. The translucent cover 85 is made of transmissive synthetic resin material (e.g., acrylic resin), and has a function as a light transmissive member to transmit the display light L1 reflected by the concave mirror 41 and the output light L2 emitted from the light emitting unit 70.

A part 86 is a light shielding layer (a light shielding part) composed of a black printed layer formed in a part of the front surface of the translucent cover 85. As the light shielding layer 86 is provided in a part of the front surface of the translucent cover 85, the translucent cover 85 is provided with a first transmissive area 85a and a second transmissive area 85b, which become a cut-out print portion (a cut-out portion) of the light shielding layer 86. Thus, the display light L1 reflected by the concave mirror 41 is transmitted (passed) through the transmissive area 85a, the output light L2 emitted from the light emitting unit 70 is transmitted (passed) through the second transmissive area 85b. The light shielding layer 86 may be formed not on the front surface of the translucent cover 85, but on the rear surface of the translucent cover 85.

Considering positional relationship between three parts, the light emitting unit 70, translucent cover 85 and windshield 13, the translucent cover 85 is configured to be arranged to face both the wind 13 and the light emitting unit 70 arranged in the housing 80 (see FIG. 2). In other words, this means that the light emitting unit 70 is arranged in the housing 80 so as to face the windshield across the translucent cover 85.

Therefore, the display light L1 reflected by the concave mirror 41 is radiated to the windshield 13 through (passing through) the first transmissive area 85a facing the concave mirror 41, the output light L2 emitted from the light emitting unit 70 is radiated to the windshield 13 through (passing through) the second transmissive area 85b facing the light emitting unit 70, and the virtual image V obtained by the radiation is visually recognized by the driver 14. The virtual image V visually recognized by the driver 14 is composed of a first virtual image described later that is displayed by reflection of the display light L1 to the driver 14, and a second virtual image described later that is displayed by reflection of the output light L2 to the driver 14.

Figure 4:
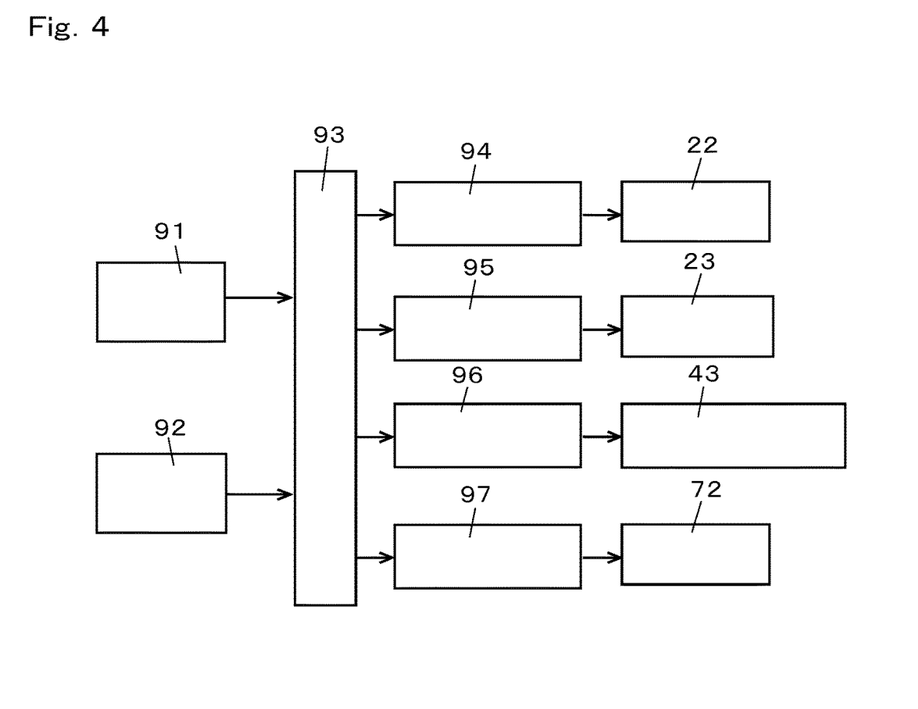
FIG. 4 is a block diagram showing an electrical configuration of a headup display apparatus for a vehicle according to the same embodiment.

The display unit 12 comprises the parts described above. Next, an electrical configuration of the headup display apparatus for a vehicle in the embodiment will be explained by referring to FIG. 4. In FIG. 4, a reference numeral 91 denotes a vehicle speed detection means, likewise, 92 denotes an operation means, 93 denotes a control means, 94 denotes a light source drive circuit, 95 denotes a liquid crystal drive circuit, 96 denotes a motor drive circuit, 97 denotes a light emitting body drive circuit, 22 denotes a light source, 23 denotes a liquid crystal display element, 43 denote a stepping motor, and 72 denotes a light emitting body.

The vehicle speed detection means 61 comprises a vehicle speed sensor for detecting a speed of a vehicle 10, and is configured to detect a vehicle speed detection signal according to a vehicle state, and to output the signal to the control means 93.

The operation means 92 comprises the pushbutton switch or the like, and is configured to drive the stepping motor 43, and to output operation data for adjusting an angular position of the concave mirror 41 to the control means 93.

The control means 93 comprises a microcomputer provided with a ROM for storing a program for processing operation, a RAM for temporarily storing a calculated value, and a CPU for executing the program, and is mounted on the printed wiring board 50.

The control means 93 outputs the vehicle speed detection signal from the vehicle speed detection means 91, and a control signal for controlling operations of the liquid crystal display element 23, light source 22, stepping motor 43, and light emitting body 72 based on the operation data entered from the operation means 92. The control signal from the control means 93 is input to drivers (drive circuits) corresponding the liquid crystal display element 23, light source 22, stepping motor 43, and light emitting body 72. The drivers operate the liquid crystal display element 23, light source 22, stepping motor 43, and light emitting body 72 according to the input signal.

When the vehicle 10 goes into a running state, the control means 93 performs predetermined calculation processing based on the vehicle speed detection signal, outputs a first command signal to the liquid crystal drive circuit 95 to cause the liquid crystal display element 23 to display a vehicle speed, and outputs a second command signal to the light source drive circuit 94 to light up the light source 22. Receiving the first command signal, the liquid crystal drive circuit 95 drives the liquid crystal display element 23. Receiving the second command signal, the light source drive circuit 94 lights up the light source 22. Thus, the liquid crystal display 20 emits the display light L1 consisting of vehicle speed display light.

The display light L1 emitted from the liquid crystal display 20 is radiated to the windshield 13 of the vehicle 10 via the first reflector 30, second reflector 40, and first transmissive area 85a. A vehicle speed image (a first virtual image) obtained by the radiation is visually recognized by the driver 14 (see FIG. 5).

Receiving the operation data from the operation means 92 in the state that the display light L1 is being emitted from the liquid crystal display 20, the control means 93 outputs a signal to drive and control the stepping motor 43 so as to rotate the concave mirror 41 to a predetermined set position. Receiving the signal, the motor drive circuit 67 outputs a signal to drive the stepping motor 43, and the stepping motor 43 is driven.

As the stepping motor 43 is driven, the rotary axis of the stepping motor 43 is driven and rotated, and the driving and rotating force is transmitted to the holding member 42 through the gear 43a fixed to the rotary axis and the gear part 42a of the holding member 42 engaged with the gear 43a. Thus, the holding member 42 is rotated around the rotary axis line R (namely, the inclination angle of the concave mirror 41 is changed), and it becomes possible to adjust the projection direction of the display light L1 as vehicle speed display light with respect to the windshield 13. In other words, a vehicle speed display image V1 displayed through the windshield 13 can be moved up and down along the vertical direction.

The control means 93 outputs a signal to control the operation of the light emitting body 72 based on the vehicle speed detection signal from the vehicle speed detection means 91. In particular, lighting of the light emitting body 72 is controlled as described below based on the vehicle speed detection signal.

Namely, in the example, only when a value of the vehicle speed detection signal entered corresponding to a vehicle operation state exceeds a predetermined threshold value (e.g., 100 km per hour), the control means 93 outputs a control signal to light up the light emitting body 72 composed of an LED. The control signal emitted from the control means 93 is input to the light emitting body drive circuit 97 that drives the light emitting body 72. Receiving the control signal, the light emitting body drive circuit 97 drives the light emitting body 72, and the light emitting body 72 is lit.

When the light emitting body 72 is lit at a vehicle speed over 100 km per hour, the output light L2 emitted from the light emitting body 72 is passed through the lens member 74, and emitted from the lens member 74 as the parallel output light. The parallel output light (the output light L2 from the light emitting body 72) is passed through the smoke tone semitransmissive cover part 73 and second transmissive area 85b, radiated to the windshield glass 13 not to be overlapped with the optical path of the display light L1, and reflected to the drive 14 by the windshield 13.

Figure 5:
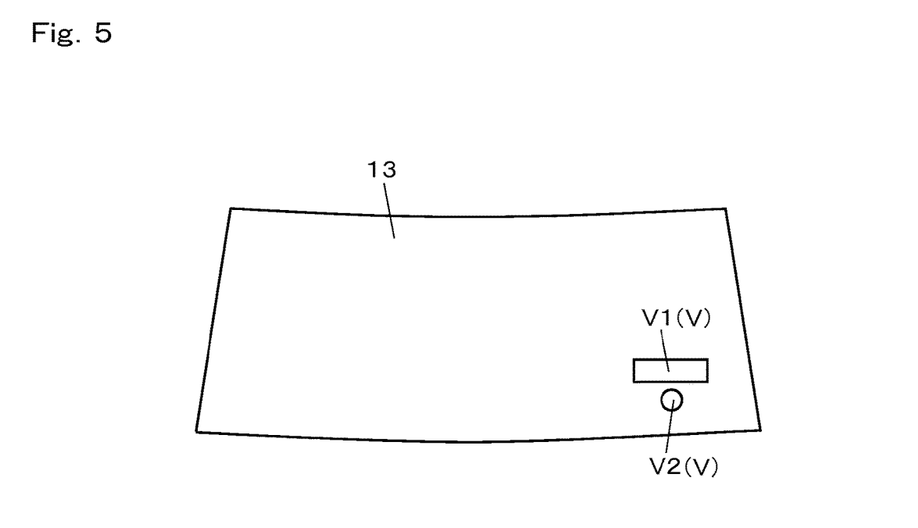
FIG. 5 is a front view of a projection member according to the same embodiment.

The driver 14 can visually recognize a warning display image (a second virtual image) V2 composed of a red light emitting image obtained by the reflection, under the vehicle speed display image V1 (see FIG. 5). As the optical path of the output light L2 from the light emitting body 72 to the windshield 13 is shorter than the optical path of the display light L1 from the liquid crystal display 20 to the windshield 13, when the driver 14 views the windshield 13, the warning display image V2 is visually recognized (displayed) in front of the vehicle speed display image V1.

As described above, in the present invention, the output light L2 emitted from the light emitting body 72 comprised of an LED is directly radiated to the windshield 13 via the translucent cover 85 (the second transmissive area 85b) without passing through the concave mirror 41. Thus, a luminance decrease of the warning display image V2 can be suppressed as much as possible, eliminating the necessity of a high-luminance LED that has been conventionally required as a light emitting body.

As a high-luminance LED becomes unnecessary, this eliminates the need for an exclusive heat radiation member that has been conventionally necessary for escaping the heat generated by a high-luminance LED to the outside of a housing. Thus, it becomes possible to suppress a luminance decrease of the warning display image V2 while avoiding a cost increase. Further, the present invention provides an advantage of warning the driver 14 of over-speed by giving a warning display by using the substantially circular red light emitting image.

The output light L2 emitted from the light emitting unit 70 deteriorates in luminance when passing through the smoke tone semitransmissive cover part 73. However, as an object of the headup display apparatus for a vehicle of the invention is to give a warning, even if luminance is decreased, display is merely blurred, and is not deteriorated in quality.

According to the embodiment described above, in the headup display apparatus for a vehicle comprising the light emitting unit 70 provided with at least the light emitting body 72 for emitting the output light L2, the concave mirror 41 for reflecting the display light L1, and the housing 80 for housing the light emitting unit 70, liquid crystal display 20, and concave mirror 41, wherein the output light L2 emitted from the light emitting body 72 and the display light L1 reflected by the concave mirror 41 are radiated to the windshield 13 of the vehicle 10 through the translucent cover 85, and the virtual image (the vehicle speed display image V1 and the warning display image V2) obtained by the radiation is visually recognized by the driver 14, the light emitting unit 70 is arranged inside the housing 80 so as to face the windshield 13 across the translucent cover 85.

Therefore, the output light L2 emitted from the light emitting body 72 comprised of an LED is directly radiated to the windshield glass 13 via the translucent cover 85 (the second transmissive area 85b) without passing through the concave mirror 41. Thus, a luminance decrease of the warning display image V2 can be suppressed as much as possible, eliminating the necessity of a high-luminance LED that is conventionally required as a light emitting body. Further, elimination of a high-luminance LED removes the need for an exclusive heat radiation member that has been conventionally necessary for escaping the heat generated by a high-luminance LED to the outside of a housing. Thus, it becomes possible to suppress a luminance decrease of the warning display image V2 while avoiding a cost increase.

Further, in the embodiment, the light emitting body 72 is fixed to the holding member 42 (the concave mirror 41) by using the screw S such that the light emitting surface 72 is faced to the translucent cover 85. Thus, even when the inclination angle of the concave mirror 41 is changed by the driver 14 by depressing the pushbutton switch (the operation means 92), the vehicle speed display image V1 and warning display image V2 are moved (up and down) along the vertical direction in the state that the relative positional relationship between the display images V1 and V2 is unchanged. Thus, it is possible to provide a headup display apparatus for a vehicle with improved display quality.

Further, in the embodiment, as an example, the case body 75 (the light emitting unit 70) is fixed to the holding member 42 (the second reflector 40). However, the case body 75 provided in the light emitting unit 70 may not be fixed to the holding member 42, and the case body 75 may be integrally formed with the housing 80. Or, the light emitting unit 70 (the cover part 73 or the case body 75) may be fixed to the translucent cover 85 by using an appropriate fixing means.

Further, in the embodiment, the warning display image V2 is displayed with the lighting of the light emitting body 72. The warning display image V2 may be flashed by flashing the light emitting body 72, for example. By flashing the warning display image V2, it is possible to increase attention of the driver 14.

Further, in the embodiment, as an example, the warning display image V2 is displayed when a vehicle speed exceeds the threshold value, and attention of the driver is aroused (the driver is warned). However, the warning display image V2 may be displayed (flashed) to arouse attention of (warn) the driver 14 when the residual fuel amount is lower than a predetermined value or a distance to a vehicle running in front of a host vehicle is shorter than a predetermined distance, for example.

Further, in the embodiment, as an example, the lens member 74 is formed in a plano-convex lens shape with a flat rear side (close to the light emitting body 72) and a convex front side (close to the cover part 73). The lens member 74 may be formed in a double-convex lens shape that the side close to the light emitting body 72 and the side close to the cover part 73 are both formed in a convex shape.

Further, in the embodiment, as an example, the display light L1 reflected by the concave mirror 41 and the output light L2 emitted from the light emitting unit 70 are radiated to the windshield 13. It is permitted to provide a combiner film that preferably reflects the display light L1 and output light L2 to the driver 14. Or, the display light L1 and output light L2 may be radiated to an exclusive projection member separate from the windshield 13.

INDUSTRIAL APPLICABILITY

The present invention is applicable to a headup display apparatus for a vehicle, which radiates an output light emitted from a light emitting body to a windshield of a vehicle, and makes a user of a vehicle to visually recognize a virtual image obtained by the radiation.

DESCRIPTION OF REFERENCE NUMERALS

12 Display device
13 Windshield (Projection member)
14 Driver (User)
20 Liquid crystal display (Display)
30 First reflector
31 Cold mirror
40 Second reflector
41 Concave mirror (Reflection member)
42 Holding member
50 Printed wiring board
60 Cover member
70 Light emitting unit (Light emitting device)
71 Circuit board
72 Light emitting body
72a Light emitting surface
73 Cover part
74 Lens member
75 Case body
75a Flange portion
80 Housing
85 Translucent cover (Transmissive part)
85a First transmissive area
85b Second transmissive area
86 Light shielding layer (Light shielding part)
91 Vehicle speed detection means
93 Control means
94 Light source drive circuit
95 Liquid crystal drive circuit
97 Light emitting body drive circuit
L Radiation light
L1 Display light
L2 Output light
S Screw (Fixing means)
V Virtual image
V1 Vehicle speed display image (First virtual image)
V2 Warning display image (Second virtual image)

The invention claimed is:

1. A headup display apparatus for a vehicle comprising:
a light emitting device provided with at least a light emitting body to emit output light and a case body for housing the light emitting body;
a display for emitting display light;
a reflection member for reflecting the display light; and
a housing for housing the case body, the display, and the reflection member, wherein
the output light emitted from the light emitting body and the display light reflected by the reflection member are radiated to a predetermined projection member through a translucent part formed in the housing,
a virtual image obtained by the radiation is visually recognized by a user of a vehicle,
the light emitting device is arranged inside the housing so as to face the projection member across the translucent part, and
a holding member supports the reflection member and is fixed to a flange portion of the case body.

* * * * *